United States Patent [19]

Becker et al.

[11] 4,141,287
[45] Feb. 27, 1979

[54] APPARATUS FOR THE PRODUCTION OF RECONSTITUTED PIMIENTO

[75] Inventors: Edmund H. Becker, Lakewood; Robert O. Lindstrom, Bay Village, both of Ohio

[73] Assignee: SCM Corporation, Cleveland, Ohio

[21] Appl. No.: 833,477

[22] Filed: Sep. 15, 1977

[51] Int. Cl.² .................... B02C 11/08; A21C 9/04
[52] U.S. Cl. ............................... 99/450.1; 99/535
[58] Field of Search ................. 99/404, 405, 443 C, 99/450.1, 534–535; 198/605, 626; 118/30; 425/71, 224, 357, 362, 371, 404; 426/92, 276, 516, 517, 803

[56] References Cited

U.S. PATENT DOCUMENTS

| 2,992,925 | 7/1961 | Green | 426/92 |
| 3,609,805 | 10/1971 | Fritsch | 425/71 |
| 3,736,862 | 6/1973 | Crommelijnck | 99/405 |
| 4,006,256 | 2/1977 | Kyros | 426/803 |

FOREIGN PATENT DOCUMENTS 1066624  4/1967  United Kingdom .................. 425/71

Primary Examiner—Leonard D. Christian
Attorney, Agent, or Firm—Richard H. Thomas

[57] ABSTRACT

A reconstituted pimiento strip useful for stuffing olives using automatic equipment is prepared by employing a forming apparatus comprising a pair of opposed, continuous belts, the lower belt being recessed on its mating surface to define a trough into which a mixture of pimiento and binder is introduced. The orientation of the belts relative the horizontal is such that both belts dip into a calcium chloride setting bath at a point intermediate their ends. The apparatus further includes discharge nozzle means to introduce the pimiento/binder mix onto the recessed area of the lower belt, the leading nip between the upper and lower belts being downstream of said nozzle means.

5 Claims, 2 Drawing Figures

APPARATUS FOR THE PRODUCTION OF RECONSTITUTED PIMIENTO

The present invention relates to the preparation of reconstituted pimiento useful in the automatic stuffing of olives.

BACKGROUND OF THE INVENTION

Spanish patent No. 426,978, assigned to Sociedad Anonima de Racionalizacion y Mecanizacion (Sadrym), describes a process for the manufacture of reconstituted pimiento wherein fresh pimiento is first subjected to the steps of roasting and then preservation in a saturated brine solution until needed for use. At the time of use, which may be several months after roasting, the pimiento is subjected to intensive washing and is then centrifuged to remove the water. Once free of water, the pimiento is ground in a colloid mill to produce a paste. This is mixed with a 1–10% sodium alginate solution, followed by homogenization of the mixture. The homogenized mixture is poured into a mold of suitable dimensions, and a calcium chloride solution is added to the mold to cause setting of the sodium alginate, which is said to take place after 30 to 45 minutes.

Although not mentioned in the patent, one of the intial steps of the process also involves decoring the pimiento, along with roasting. The purpose of the roasting and decoring steps is to remove the pimiento skin and seeds, respectively. The reason for this is that it is necessary to obtain a reconstituted pimiento strip of relatively uniform quality and consistency, and grinding in a colloid mill fails to reduce the particle size of the skin and seeds to the same particle size as the pimiento flesh. Such decoring and roasting substantially adds to the cost of the production.

Copending applications Ser. No. 833,471 filed Sept. 15, 1977 and Ser. No. 833,453 filed Sept. 15, 1977 describe certain process steps by which the above disadvantages of the process of the Spanish patent are overcome. However, it should be mentioned that one further disadvantage experienced with the process of the Spanish patent if adapted for continuous molding is obtaining a complete and uniform set of the pimiento strip during the setting stage, and a dimensionally uniform strip. If the formulation of the pimiento/binder is established to obtain an almost immediate fast set of the strip to maintain uniform dimensions, this resuls in a relatively hardened skin initially which slows introduction of calcium ions into the center of the strip and uniform setting or hardening throughout. On the other hand, if the pimiento/binder mix is formulated to obtain a relatively slow set, then there may be insufficient setting in the molding stage to achieve uniform dimensions.

SUMMARY OF THE INVENTION

The above and other disadvantages are overcome, in accordance with the concepts of the present invention, by employing a forming apparatus comprising a pair of opposed, continuous belts, the lower belt being recessed on its mating surface to define a trough into which a mixture of pimiento and binder is introduced. The orientation of the belts relative the horizontal is such that both belts dip into a calcium chloride setting bath at a point intermediate their ends. The apparatus further includes discharge nozzle means to introduce the pimiento/binder mix onto the recessed area of the lower belt, the leading nip between the upper and lower belts being downstream of said nozzle means.

Preferably, the belt material is of a food approved synthetic polymer having absorbent fibers therein to provide a wicking action while at the same time achieving a degree of rigidity necessary for shape control. One suitable belt employed is about 50% neoprene and 50% cotton.

BRIEF DESCRIPTION OF THE DRAWING

The invention and advantages thereof will become apparent upon consideration of the following drawing, in which.

Figure 1:
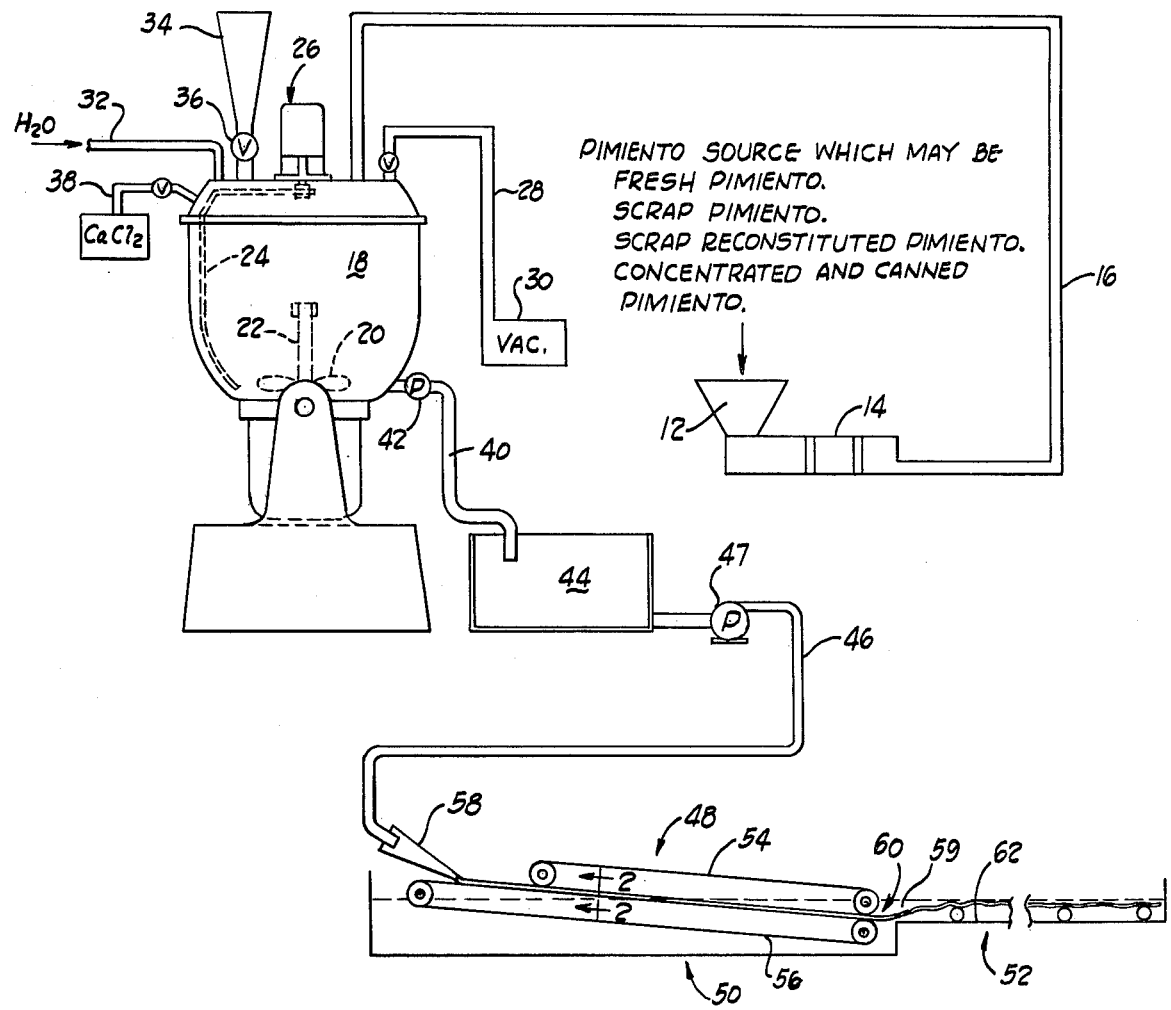
FIG. 1 is an elevation view of apparatus which may be employed in the process of the present invention.

Referring to the drawing, the pimiento to be reconstituted is introduced into hopper 12 for cutter 14.

Previous to this step, fresh or harvested pimiento, which is the whole pimiento including seeds and skins, minus stems, is first treated by quartering, for instance to pieces of about 3 centimeters in width, and then salting and preservation in brine. This is accomplished by adding the fresh or harvested cut pimiento to a cask and then adding enough salt to obtain a supersaturated salt brine of about 26% concentration. The pimiento is left in the brine for at least about 2-3 months, to permit fermentation. When needed for use, the pimiento is removed from the brine and is intensively washed to lower the salt content to about 0.5% or less. This may be carried out in a number of different ways, one way being first washing the pimiento on a vibrating or continuous screen or belt which has a fine particle size mesh to avoid loss of seeds and skins. This first wash removes salt crystals from the surface of the pimiento and lowers the concentration to about 13.5%. The pimiento pieces are then tumbled in water for an extended period, for instance about one hour to about 8½ hours. This lowers the salt concentration to the desired level. The removal of salt is necessary to obtain subsequent setting with the use of calcium chloride.

Alternatively, the fresh or harvested pimiento pieces may be prepared and preserved for subsequent use by conventional canning and concentration procedures.

As still another alternative, the fresh pimiento or harvested pimiento may be employed directly, during the harvesting season, without either brine preservation or canning and concentration. As still further alternatives, the pimiento source can be pimiento stabilized or preserved by a variety of means such as freezing or refrigeration, dehydration, e.g., spray drying, vacuum drying, lyophilization, air drying, intermediate moisture preservation by control of water activity, and other preservation means known to those skilled in the art. Additionally, the pimiento source can be scrap pimiento, from the forming steps or olive-stuffing operation. In any event, the pimiento, which may be any of the above, is cut into very fine uniform particle size pieces in the cutter 14. A preferred cutter is one manufactured by Stephan u. Sohne, Hameln, Germany, known as the Stephan Micro-Cut, Models MCHD. These cutters which are available in different capacities employ an auger feed from the hopper 12. In the model selected, the feed pimiento is first introduced into a cutting rotor the purpose of which is to dissect the pimiento to relatively coarse particle sizes. This cutting rotor is then followed by two cutting stages, each stage comprising a stationary cutting blade and a cooperating rotating cutting blade. In the particular model used, each cutting blade comprised a disc of about 180 millimeters in diameter with 24 carbide cutting teeth at equally spaced intervals on the periphery of the disc forming the overall shape of a crown. The two blades face each other with the rotor teeth turning within the stator teeth defining a clearance through which all the feed must pass. The first stage was adjustable to a clearance within the range of 0.20–0.15 millimeter. The second and fine-cut stage was adjustable within the range of 0.10 millimeter to 0.05 millimeter. The rotating blades were rotatable at 3000 rpm, driven by a 35 horsepower motor (specifications 380 volts, 50-60 cycles, and 25 kw).

It was found that very satisfactory results were obtained with blade settings, in the first and second stages, of 0.15 millimeter and 0.05 millimeter, respectively. This means that the cut pimiento, following the cutting operation, had a maximum particle size not substantially greater than about 0.5 millimeter. This is substantially finer than the 0.01 inch particle size mentioned in U.S. Pat. No. 4,006,256.

Preferable maximum particle size ranges for the process of the present invention are about 1 centimeter-0.1 millimeter for the first stage and 0.1–0.01 millimeter for the second stage.

One surprising aspect of the present invention is that it was discovered that such cutters were capable not only of reducing the pimiento flesh to the desired particle size, but also reducing pimiento skins and seeds to the same particle size. It was also discovered that this was carried out without ascertainable heating of the pimiento. Still further it was discovered that the reduced particle size afforded substantially increased surface area resulting in an improved bond with the sodium alginate and the production of a stronger reconstituted product more closely duplicating the characteristics of historically used stuffing pimiento. In addition, the Micro-Cut produces more uniform particle sizes than obtainable with conventional equipment such as a Waring blender or colloid mill. The particles obtained have a normal particle size distribution with a very small standard deviation.

Figure 2:
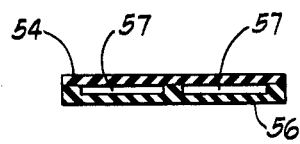
FIG. 2 is a section view through line 2—2 of FIG. 1.

From the cutter, the pimiento pieces are forced along pipe 16, this force being imparted by the cutter 14, to mixing vessel 18. Although the present invention is not limited to the use of any particular mixing vessel, the vessel employed in this example was also made by Stephan u. Sohne, identified as mixer UM 80 E-NI. The vessel is capable of operation at 1500 rpm and 3000 rpm, and is provided with mixing blades 20, rotatable on a bottom supported, axial shaft 22, driven by a 20-25 horsepower motor. A sickle-shaped scraper arm 24, rotatable in either direction and driven by an axially positioned top motor 26, of 0.75 horsepower, scraps the wall of the vessel and prevents the formation of a stationary vortex. Penetrating the top of the vessel, in addition to pipe 16 for the cut pimiento, are pipe 28, leading to vacuum pump 30; pipe 32, leading to a suitable source of water (not shown); funnel 34 for dry mix, including metering valve 36; and pipe 38 for metering a small amount of calcium chloride solution into the vessel. The bottom of the vessel is provided with a pipe 40 having a positive displacement pump 42 for pumping the vessel contents into storage tank 44. An outlet pipe 46 from the storage tank is provided with a positive displacement Moyno pump 47, capable of uniform delivery, for transmitting the pimiento/sodium alginate mixture to a forming apparatus 48. This is schematically shown as comprising a belt section 50 followed by a trough or setting section 52. The belt section comprises upper and lower belts 54 and 56, the lower belt being slotted so that when the opposed surfaces of the two belts mate they form a closed trough 57 (FIG. 2) into which the pimiento/sodium alginate mixture is extruded by nozzle 58. The two belts contain and form the mixture into the desired form, and carry the same into a bath 59 of calcium chloride solution. At the exit nip 60 formed by the belts, the formed strip of pimiento is flowed into the elongated trough 62 of the setting section. The speeds and length of the section are adapted for holding the formed strip in the calcium chloride solution for whatever period is necessary, up to 35-40 minutes, to obtain complete setting throughout.

In this regard, copending application Ser. No 833,453, of even date herewith, describes a process by which the setting time can be substantially reduced, for instance down to ideally a matter of a few minutes.

As shown in the drawing, the belt assembly is slightly slanted so that the lower belt with extruded mixture on it enters the calcium chloride bath downstream of the leading or entering nip between the upper and lower belts. Both the upper and lower belts at their lower ends are immersed in the setting solution. In this way, the belts and extruded mixture are thoroughly wetted by the setting solution during the forming step. The belt material is of a food approved synthetic polymer having absorbent fibers therein to provide a wicking action while at the same time achieving a degree of rigidity necessary for shape control. In this particular example, the belts employed where about 50% neoprene and 50% cotton.

From the setting section, the formed and set strip may be passed directly to automatic slitting and stuffing equipment for stuffing olives, of known design, or alternatively may be packaged in a brine for subsequent use.

The particular formulation of pimiento and binder useful in the process and apparatus of the present invention is not critical. Preferably, the binder is sodium alginate, and the setting agent is calcium chloride. The dispersion must be in water, but natural pimiento contains a substantial amount of water, typically about 90–95%. The dispersion can contain up to as much as 99% pimiento, plus about 1% sodium alginate. Acceptable products can be prepared, at the other extreme of the range, with amounts of pimiento as low as about 5% by weight. Preferably, the amount of pimiento employed is within the range of about 25% to about 95%. Less flexibility is available with regard to the sodium alginate content, although this may be varied over a wide range, from about 0.5% up to not substantially greater than about 10%.

The formulation may contain ingredients in addition to the pimiento and sodium alginate, for instance up to about 15% of a dispersing agent such as a carbohydrate, one specific such carbohydrate being dextrose monohydrate; up to about 10% of a thickening agent such as guar gum; and up to about 2% of a colorant, such as paprika extract, which provides a uniform red color characteristic of pimiento. Above the 2% level, the paprika extract offers no color enhancement, and tends to flavor the reconstituted product. As mentioned above, some of the setting agent, for instance calcium chloride, can be added to the mix to obtain a preset. In the case of calcium chloride, the amount added can vary within the range of about 0-0.2%.

In a particular example, in accordance with the concepts of the present invention, in the processing of 50 kilogram batches of pimiento mix (tests were also run employing a smaller mixer, Stephan Model UMTA 15 D) the following formulation was employed:

| Ingredients | Percent |
| --- | --- |
| Desalted pimiento | 41.641 |
| Water | 51.500 |
| Dextrose monohydrate | 3.500 |
| Sodium alginate | 2.700 |
| Guar gum | 0.440 |
| Paprika extract | 0.210 |
| Calcium chloride | 0.009 |

The order of addition of the above ingredients to mixing vessel 18 is important. In a preferred mode of operation, water is introduced to the mixer in the desired amount. The mixer is turned on, at 1500 rpm, forming a vortex. The dry ingredients in funnel 34 are metered into the vortex, and blending is continued for about one minute. At this point, the Micro-Cut is turned on for introducing the pimiento pieces into the vortex over a half minute period. The remaining half minute is used to blend the sodium alginate solution and pimiento pieces, and near the end of this period, within a few seconds of the end, the calcium chloride solution is added resulting in an almost immediate partial preset of the mixture. This is to a consistency which is pumpable but stiff, defined as non-pourable. It should be noted that the 0.009 value for the calcium chloride is the weight of dry calcium chloride added. It is necessary that the calcium chloride be added as a solution, and the water employed in making up the solution is part of the 51.5% value. The concentration of the calcium chloride solution used was 0.8%. The amount of calcium chloride, dry weight, to obtain a preset, should be at least about 0.005%.

The entire mixing step is carried out under a vacuum sufficient to prevent the formation of voids in the formed product which would tend to weaken the product.

Following mixing and storage in tank 44, the partially set mix is passed through nozzle 58 at a flow rate sufficient to fill the belt cavities, the belt moving at about 1 meter per minute. The concentration of the calcium chloride solution is about 8%. The belt material is cotton impregnated with a food approved synthetic polymer. This provides absorbency of the belt together with rigidity for shape control. Dimensions of the belt cavity are 23 centimeters by 3 millimeters.

The reconstituted pimiento strips produced following cutting (for instance, into 27–36 millimeter strips) and storage show excellent and uniform shape, consistency, strength, color, texture and flavor characteristics. The strips are useful for the automatic stuffing of olives.

What is claimed is:

1. Apparatus for making reconstituted pimiento in strip form useful for stuffing olives comprising
    mixing means for producing a mix of a pimiento base and a binder;
    nozzle means adapted to receive said mix from the mixing means and to extrude the same at the approximate dimensions desired of said strip;
    a lower longitudinally extending, continuous forming belt adjacent said nozzle means adapted to receive said mix from the nozzle means having an axial, longitudinally extending recessed are of substantially uniform dimension and said approximate dimensions;
    means supporting said belt to provide a substantially flat belt upper run at a slight angle relative the horizontal thereby having a lower end and an upper end slightly higher in elevation than the lower end;
    first tank means maintaining a bath setting solution at a level to immerse said belt lower end in said bath;
    an upper continuous belt;
    means supporting said upper belt in mating contact with the lower belt upper run to establish a closed forming trough for said pimiento base mix, the upper belt also having a lower end immersed in said bath;
    the leading point of contact between the upper and lower belts being intermediate the point of immersion of the upper and lower belts, said bath and the nozzle means.

2. The apparatus of claim 1 wherein said upper belt has a substantially flat mating surface with the lower belt upper run.

3. The apparatus of claim 1 wherein said belts are of a material comprising a mixture of a food approved synthetic polymer and an absorbent fibrous material.

4. The apparatus of claim 3 wherein said belts are approximately 50% neoprene and 50% cotton fibers.

5. The apparatus of claim 1 further including
    a second tank means defining an elongated extension of said first tank means extending from said belt lower end;
    means to maintain a setting solution in said second tank means; and
    means to move the reconstituted pimiento strip through the second tank means and to maintain the reconstituted pimiento strip in an unsupported and unconfined manner in said second tank setting solution.

* * * * *

UNITED STATES PATENT AND TRADEMARK OFFICE
CERTIFICATE OF CORRECTION

PATENT NO. : 4,141,287
DATED : February 27, 1979
INVENTOR(S) : Edmund H. Becker; Robert O. Lindstrom It is certified that error appears in the above-identified patent and that said Letters Patent are hereby corrected as shown below:

Column 1, line 48, change "resuls" to --results--. Column 3, line 20, change "0.5" to --0.05--; line 55, change "scraps" to --scrapes--. Column 4, line 33, change "where" to --were--. Column 6, line 14, in claim 1, change "are" to --area--.

Signed and Sealed this

Fifteenth Day of May 1979

[SEAL]

Attest:

RUTH C. MASON
Attesting Officer

DONALD W. BANNER
Commissioner of Patents and Trademarks